United States Patent [19]

Sasaki et al.

[11] Patent Number: 4,937,561
[45] Date of Patent: Jun. 26, 1990

[54] LOAD DETECTING SYSTEM FOR AN ENGINE DRIVEN GENERATOR

[75] Inventors: Asao Sasaki; Masami Minegishi, both of Tokyo, Japan

[73] Assignee: Fuji Jukogyo Kabushiki Kaisha, Tokyo, Japan

[21] Appl. No.: 300,110

[22] Filed: Jan. 18, 1989

[30] Foreign Application Priority Data

Feb. 3, 1988 [JP] Japan .................................. 63-024481

[51] Int. Cl.⁵ .......................................... G08B 21/00
[52] U.S. Cl. .................................... 340/646; 340/644; 340/648; 340/662; 318/434; 361/20; 361/21; 361/30; 361/33
[58] Field of Search ................ 340/648, 644, 646, 662; 361/20, 21, 30, 33, 86, 91; 318/434

[56] References Cited

U.S. PATENT DOCUMENTS

| | | | |
|---|---|---|---|
| 3,775,675 | 11/1973 | Freeze | 340/646 |
| 3,793,559 | 2/1974 | Ristuccia | 340/646 |
| 3,855,503 | 12/1974 | Ristuccia | 340/646 |
| 4,156,172 | 5/1979 | Hucker | 361/21 |
| 4,451,823 | 5/1984 | Penn | 340/648 |
| 4,755,737 | 7/1988 | Komurasaki | 361/91 |
| 4,789,817 | 6/1988 | Asakura | 361/21 |

FOREIGN PATENT DOCUMENTS

59-2937 1/1984 Japan .

Primary Examiner—Joseph A. Orsino
Assistant Examiner—Kinfe-Michael Negash
Attorney, Agent, or Firm—Martin A. Farber

[57] ABSTRACT

A system for detecting load has a first detector for detecting load on a generator based on the voltage in a circuit of an armature of the generator, and a second detector for detecting the load on the generator based on the voltage in a circuit inductively coupled to the armature circuit. An output of the first detector is compared with a first reference value by a first comparator and a first overload signal is produced when exceeding the first reference value. A second comparator is provided for producing a second overload signal when exceeding a second reference value. In response to the first and second overload signals alarm lamps are turned on for providing an alarm of the overload.

6 Claims, 9 Drawing Sheets

LOAD DETECTING SYSTEM FOR AN ENGINE DRIVEN GENERATOR

BACKGROUND OF THE INVENTION

The present invention relates to a system for detecting load on an engine driven generator in which the load is detected in accordance with output voltage.

In a load detecting system provided in an engine driven generator such as a generator described in Japanese Utility Model Application Laid-Open 59-2937, voltage produced in a main coil circuit is transferred through a current transformer, for detecting the load on the generator.

Figure 8:
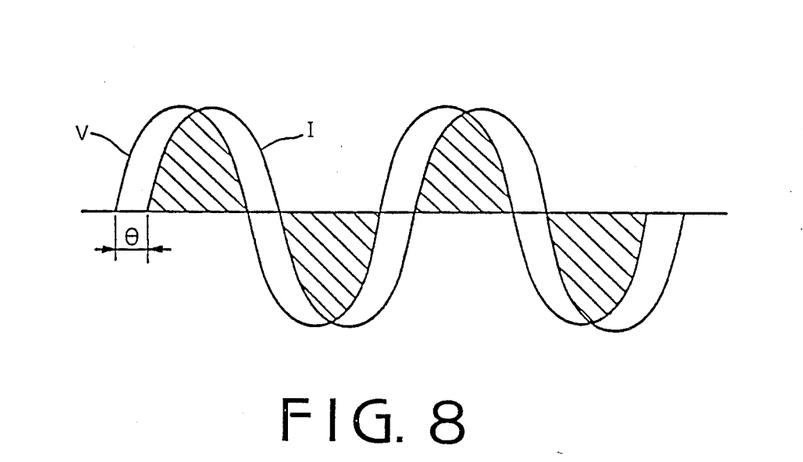
FIG. 8 shows waveforms showing an active power produced by the phase difference between voltage and current.

However, as shown in FIG. 8, a phase difference $\theta$ between current I and voltage V in the main coil occurs because of the load in the coil circuit. Consequently, active power (shown by hatched zone) reduces. The active power Ta produced in the main coil circuit with respect to apparent power T ($=V \times I$) generated by the generator is $$Ta = V \times I \times \cos\theta$$

Consequently, reactive power dependent on power factor $\cos\theta$ generates. For example, if the power factor $\cos\theta$ is 0.7, the current transformer detects only the output of 14A, in spite of the output of 20A in the main coil.

Because of such a detected small output, an operator determines that the generator has a spare output sufficient to bear a further load. However, the maximum output is produced in the main coil, and a further loading exceeds the capacity of the generator, which will cause failure such as engine stall.

In order to eliminate this disadvantage, it is considered to provide a power-factor indicator. However, the indicator is expensive and large in size, and hence the manufacturing cost increases and the generator becomes large in size.

SUMMARY OF THE INVENTION

An object of the present invention is to provide a load detecting system for an engine driven generator which accurately detects load on the generator without the influence of the power factor.

Another object of the present invention is to provide a system which is small in size with a low cost.

According to the present invention, there is provided a system for detecting load on an engine driven generator comprising first detector means for detecting the load on the generator based on the voltage in a circuit having a main coil, second detector means for detecting the load on the generator based on the voltage in a circuit having a coil inductively coupled to the main coil, first comparator for comparing an output of the first detector means with a first reference value and for producing a first overload signal when exceeding the first reference value, second comparator for comparing an output of the second detector means with a second reference value and for producing a second overload signal when exceeding the second reference value, and alarm means responsive to the first and second overload signals for alarming the overload In an aspect of the invention, the first and second comparators are arranged to produce the respective overload signals in accordance with power factor dependent on the load, and each of the first and second detector means includes a current transformer.

The other objects and features of this invention will become understood from the following description with reference to the accompanying drawings

DETAILED DESCRIPTION OF THE PREFERRED EMBODIMENTS

Figure 4:
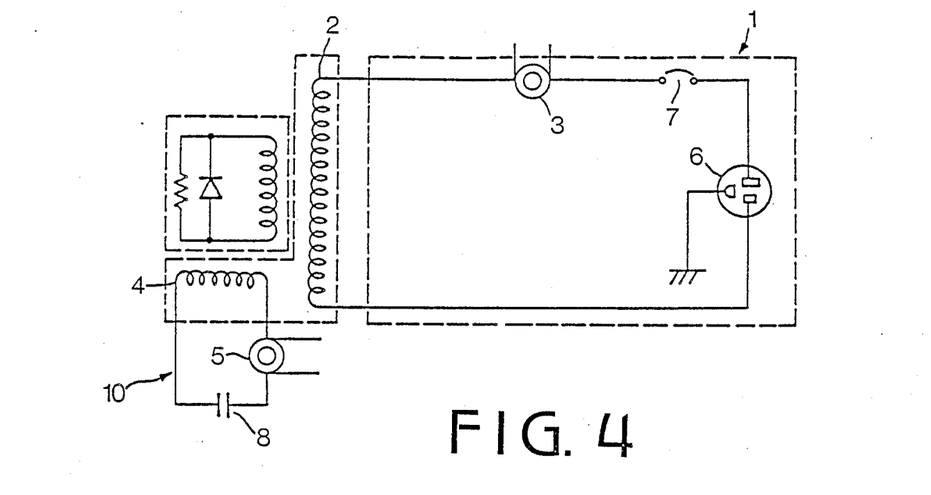
FIG. 4 is a wiring diagram of the engine driven generator.

Referring to FIG. 4 showing a diesel engine driven generator, an alternating-current generator comprises an armature 1 having a main coil 2 and a load detector circuit 10 having a coil 4 inductively coupled to the coil 2. The circuit of armature 1 has a current transformer 3 for detecting current generated in the main coil 2 when a load is connected at a socket 6, and a current protective device 7. The circuit 10 has a current transformer 5 for detecting voltage produced in the coil 4, and a capacitor 8.

As aforementioned, if the power factor $\cos\theta$ is not one (1), the current transformer 3 cannot detect actual power which is applied from the generator to the load. The circuit 10 operates for preventing reduction of the output voltage of the main coil 2. Namely, the voltage in the circuit represents the apparent power as a level of the load on the generator. The present invention uses such a function of the circuit.

Figure 1:
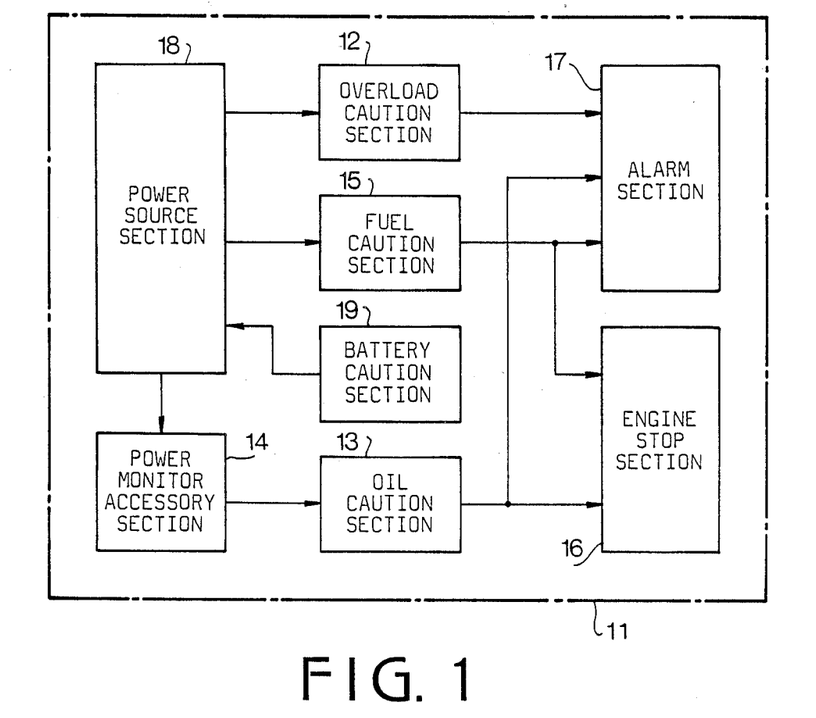
FIG. 1 is a block diagram of a control system of an engine driven generator according to the present invention.

Referring to FIG. 1, a control system 11 of the present invention comprises an overload caution section 12, an oil caution section 13, a power monitor accessory section 14, a fuel caution section 15, an engine stop section 16, an alarm section 17, and a source section 18, each of which will be described hereinafter in detail.

Figure 2:
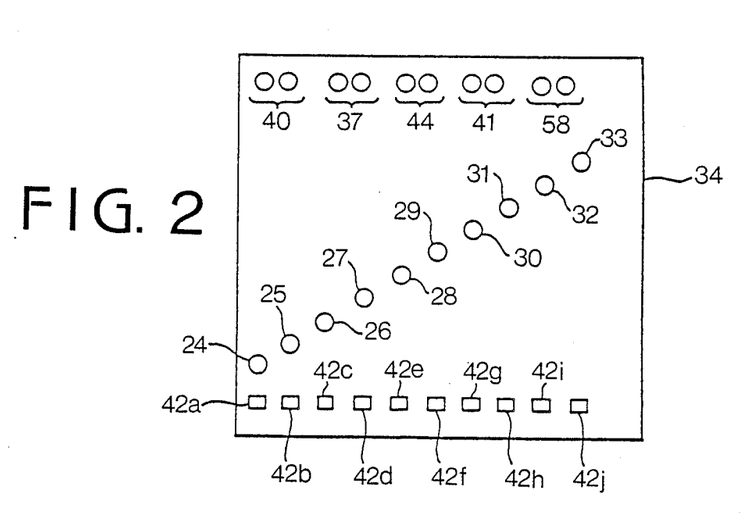
FIG. 2 is a schematic plan view of a display panel.

FIG. 2 shows a display panel 34 on which a plurality of lamps and light emitting diodes (LEDs) operated in accordance with signals from respective sections are disposed. The operation thereof will be also described hereinafter.

Overload Caution Section

Figure 3A:
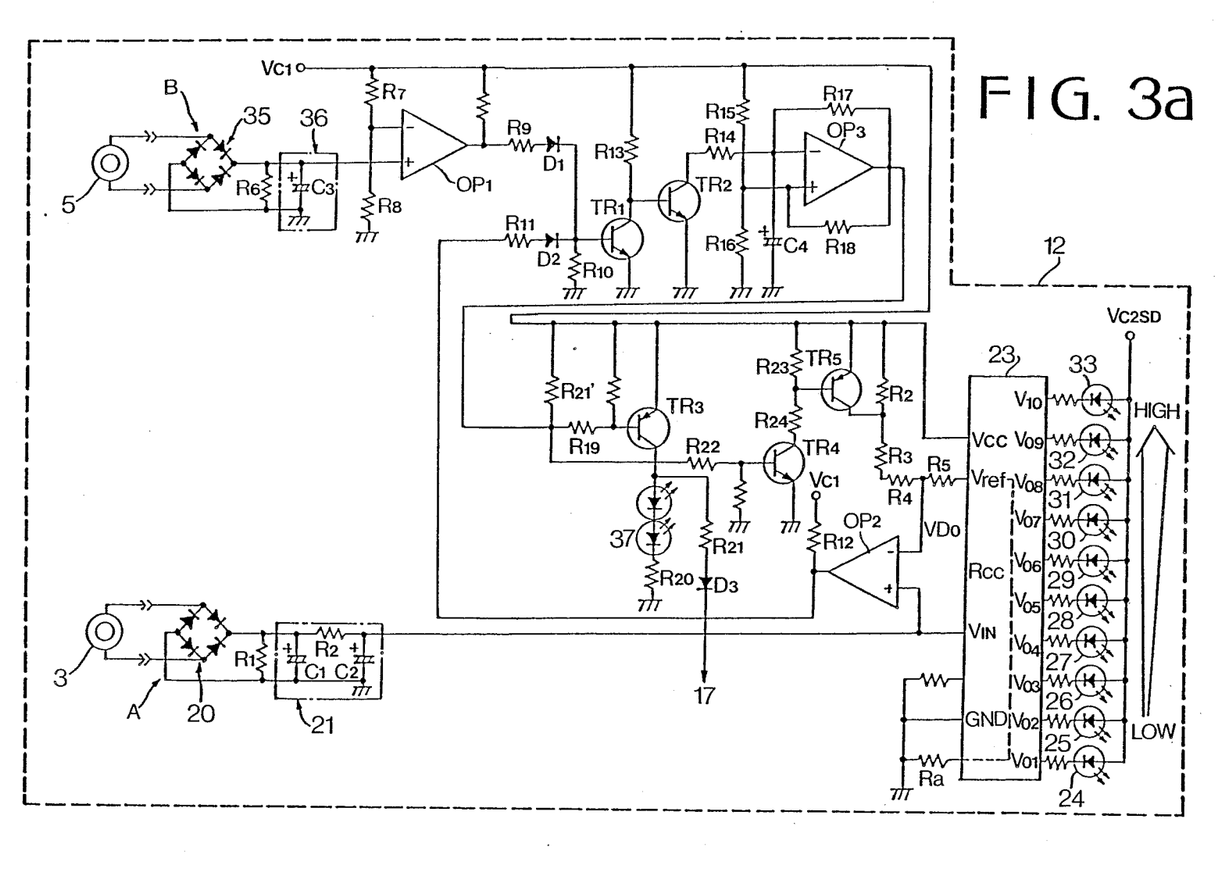
FIG. 3a is a circuit showing an overload caution section of the control system.

Referring to FIG. 3a, the overload caution section 12 is provided for detecting load on the generator in accordance with the output voltage of the generator and for displaying the load during actual driving on the display panel 34. The section 12 comprises a first load detecting circuit A for detecting the load of the main coil 2 and a second load detecting circuit B for detecting the load of the coil 4. In the circuit A, the current transformer 3 is connected to a full-wave rectifier 20 which is connected to an input terminal $V_{IN}$ of a level meter 23 through a resistor R1 and a smoothing circuit 21 having a resistor R2 and capacitors C1 and C2. The resistor R1 and the smoothing circuit 21 are provided for ensuring a linearity of the direct current voltage.

A terminal Vcc of the level meter 23 is connected to a power source Vc1, for applying a starting voltage (battery voltage >Vc1). The voltage from the power source Vc1 is applied to a reference terminal Vref as a reference voltage through resistors R2, R3, R4, R5, and Ra. Output terminals V01 to V10 of the level meter 23 are respectively connected to cathodes of light emitting diodes (LEDs) 24 to 33 as a voltage monitor provided on the display panel 34.

The level meter 23 compares the voltage applied to the input terminal $V_{IN}$ with the reference voltage applied to the reference terminal Vref and operates to turn on the LEDs 24 to 33 from a low level to a high level as shown in FIG. 3a in order, in accordance with the result of the comparison. As shown in FIG. 2, the LEDs 24 to 33 are equidistantly disposed from a left side low position to a right side upper position on the panel 34.

Anodes of the LEDs 24 to 33 are connected to a battery power source Vc2SD which is connected to a battery of the engine through the source section 18 (FIG. 1) and a key switch (not shown) of the engine.

In the circuit B, the current transformer 5 is connected to a full-wave rectifier 35 which is connected to a non-inverting input terminal of a comparator OP1 through a resistor R6 and a smoothing circuit 36 having a capacitor C3. An inverting input terminal of the comparator OP1 is applied with a reference voltage from the power source Vc1 divided through resistors R7 and R8.

An output terminal of the comparator OP1 is connected to a diode D1 through a resistor R9. A cathode of the diode D1 is connected to a base of an NPN transistor TR1 to which a resistor R10 and a cathode of a diode D2 are connected. An anode of the diode D2 is connected to the power source Vc1 through resistors R11 and R12.

Between resistors R11 and R12, an output terminal of a comparator OP2 is connected. A non-inverting input terminal of the comparator OP2 is connected to the input terminal $V_{IN}$ of the level meter 23 and an inverting input terminal thereof is connected between resistors R4 and R5 for applying the reference voltage.

A collector of the transistor TR1 is connected to the power source Vc1 through a resistor R13 and an emitter thereof is connected to the ground. Between the collector of the transistor TR1 and the resistor R13, a base of an NPN transistor TR2 is connected.

A collector of the transistor TR2 is connected to an inverting input terminal of a pulse generator OP3 through a resistor R14. A non-inverting input terminal thereof is applied with the reference voltage from the source Vc1 divided through resistors R15 and R16 which are connected to the source Vc1 in series. An output terminal of the pulse generator OP3 is connected to inverting and non-inverting input terminals thereof through resistors R17 and R18, respectively, in feedback connection. A capacitor C4 is connected between the resistor R17 and the inverting input terminal.

When the transistor TR2 is turned on, the pulse generator OP3 produces a high level (H) signal. When the transistor TR2 is turned off, the pulse generator OP3 alternately produces a high level (H) signal and a low level (L) signal in accordance with a compared value between the reference voltage of the non-inverting input terminal and a discharge voltage from the capacitor C4.

The output terminal of the pulse generator OP3 is further connected to a base of a PNP transistor TR3 through a resistor R19. An emitter of the transistor TR3 is connected to the power source Vc1 and a collector thereof is connected to the ground through overload lamps 37 disposed on the display 34 and a resistor R20.

A diode D3 is connected to a juncture between an anode of the lamp 37 and the collector of transistor TR3 through a resistor R21. A cathode of the diode D3 is connected to the alarm section 17.

A base of a transistor TR4 is connected to the power source Vc1 through resistors R21' and R22. A collector of the transistor TR4 is connected to the source Vc1 through resistors R23 and R24 and an emitter is connected to the ground.

Between resistors R23 and R24, a base of a PNP transistor TR5 is connected. An emitter of the transistor TR5 is connected to the source Vc1 and a collector is connected between resistors R2 and R3.

When the transistor TR5 is turned on, the reference voltage applied to the terminal Vref of the level meter 23 becomes high so that LEDs 24 to 33 are turned off. When the transistor TR5 is turned off, the LEDs again emit lights. Thus, by turning on/off of the transistor TR5, the LEDs intermittently emit lights.

Oil Caution Section

Figure 3B:
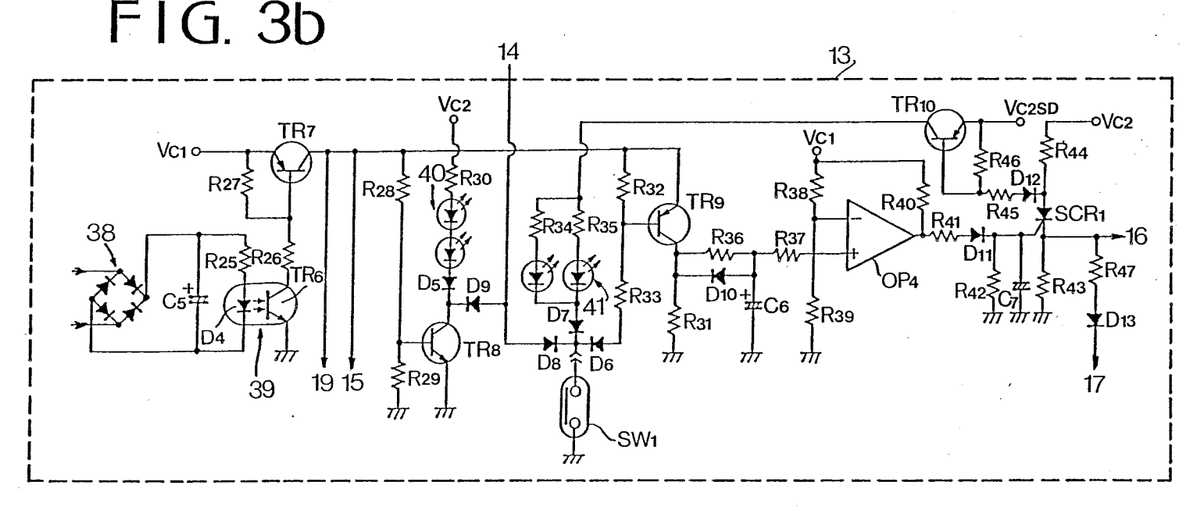
FIG. 3b is a circuit showing an oil caution section of the control system.

Referring to FIG. 3b, the oil caution section 13 detects the reduction of pressure of the lubricating oil and indicates a lack of the oil. The section 13 has a full-wave rectifier 38 connected to a battery charging tap (not shown). The rectifier 38 is connected to a light emitting diode D4 provided in a photocoupler 39 through a capacitor C5 and a resistor R25.

A collector of a photo transistor TR6 in the photocoupler 39 is connected to a base of a PNP transistor TR7 through a resistor R26. An emitter of the transistor TR7 is connected to the power source Vc1 and further to the base thereof through a resistor R27. A collector thereof is connected to the fuel caution section 15, to the battery caution section 19, and to resistors R28 and R29 connected in series.

Between resistors R28 and R29, a base of an NPN transistor TR8 is connected. A collector of the transistor TR8 is connected to a cathode of a diode D5 and to a cathode of a diode D9. An emitter thereof is connected to the ground. An anode of the diode D5 is connected to a battery source Vc2 through operating lamps 40 and a resistor R30. The operating lamps 40 are provided on the display 34.

The collector of the transistor TR7 is further connected to an emitter of a transistor TR9. A base of the transistor TR9 is connected to the ground through a resistor R33, a diode D6, and an oil pressure switch SW1. The oil pressure switch SW1 is operated in accordance with the pressure of the lubricating oil.

A cathode of the diode D6 is connected to diodes D7 and D8 at cathodes thereof. An anode of the diode D7 is connected to a pair of oil lamps 41 connected in parallel. Oil lamps 41 which are disposed on the display 34 are connected to a collector of a PNP transistor TR10 through resistors R34 and R35.

An anode of the diode D8 is connected to the power monitor accessory section 14 and to an anode of the diode D9.

The base of the transistor TR9 is further connected to the emitter thereof through a resistor R32. A collector thereof is connected to the ground through a resistor R31 and to a non-inverting input terminal of a comparator OP4 through resistors R36 and R37.

Between resistors R36 and R37, a capacitor C6 is connected. A diode D10, a cathode of which is connected to the collector of the transistor TR9 is connected to the resistor R36 in parallel.

An inverting input terminal of the comparator OP4 is connected between resistors R38 and R39 which are connected to the source Vc1 in series. A resistor R40 is connected between the source Vc1 and an output terminal of the comparator OP4, to which an anode of a diode D11 is further connected through a resistor R41. A cathode of the diode D11 is connected to a gate of a thyristor SCR1. Between the diode D11 and the thryristor SCR1, a resistor R42 and a capacitor C7 are connected.

A cathode of the thyristor SCR1 is connected to the ground through a resistor R43 and an anode thereof is connected to the battery source Vc2 through a resistor R44. Between the cathode of the thyristor SCR1 and the resistor R43, the engine stop section 16 is connected and the alarm section 17 is connected through a resistor R47 and a diode D13.

A base of the transistor TR10 is connected between the resistor R44 and the thyristor SCR1 through a resistor R45 and a diode D12. An emitter thereof is connected to the source Vc2SD. A resistor R46 connected to the source Vc2Sd is connected between the base of the transistor TR10 and the resistor R45.

Figure 3C:
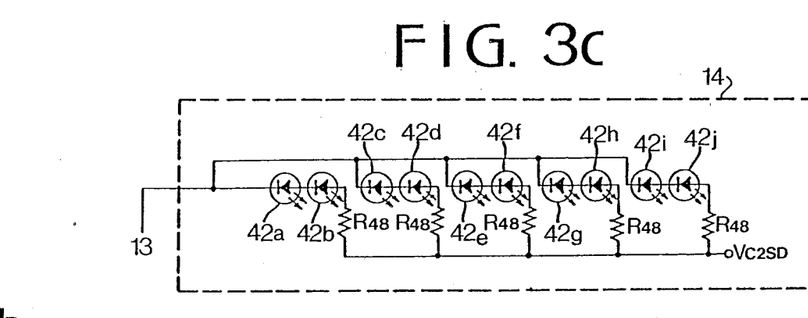
FIG. 3c is a circuit showing a power monitor accessory section of the control system.

Referring to FIG. 3c, the power monitor accessory section 14 connected to the oil caution section 13 comprises a plurality of pair of light emitting diodes (LEDs) 42a to 42j connected to the anode of the diode D8 at cathodes thereof. Anodes of the LEDs are connected to the source Vc2SD through resistors R48.

LEDs 42a to 42j emit lights when the oil pressure switch SW1 and the transistor TR8 are turned on. Thus, LEDs 42a to 42j emit lights as long as the key switch is closed.

As shown in FIG. 2, LEDs 42a to 42j are horizontally disposed on the panel 34 corresponding to LEDs 24 to 33 of the overload caution section 12 so as to form an X coordinate for the LEDs 24 to 33.

Fuel Caution Section

Figures 3D, 3F:
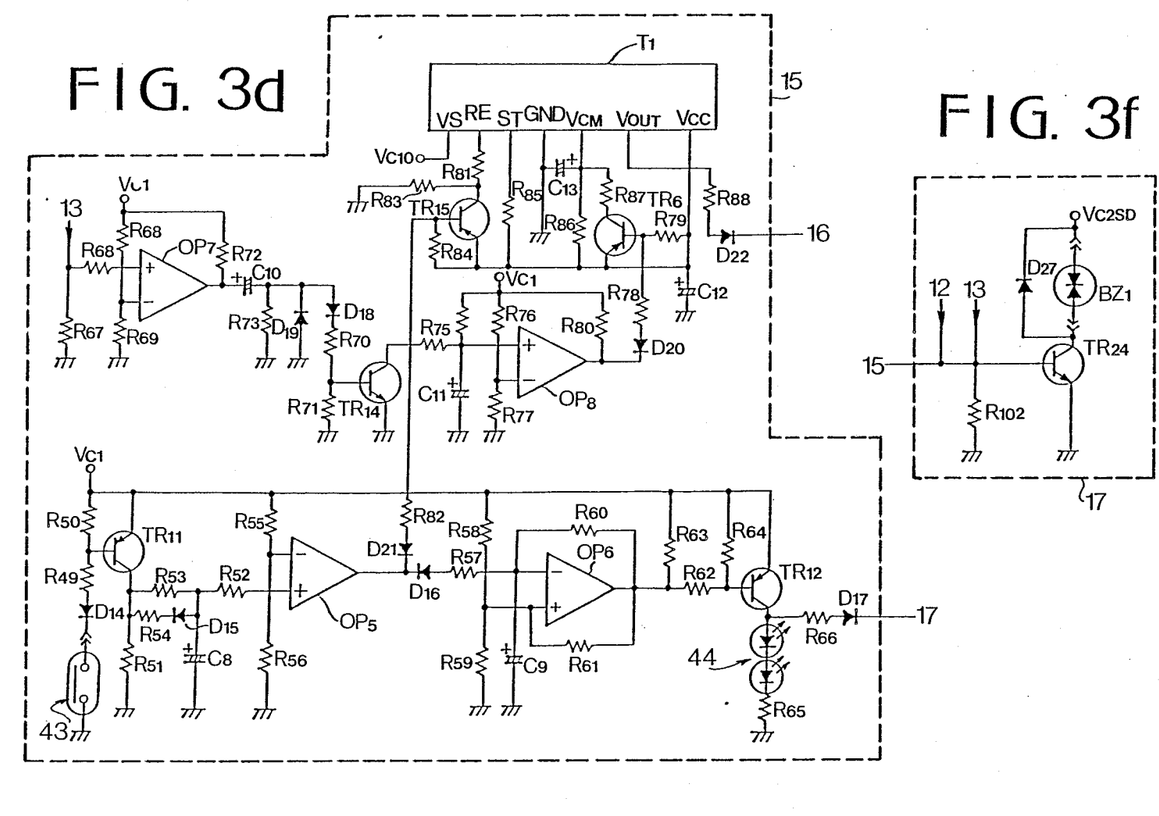
FIG. 3d is a circuit showing a fuel caution section of the control system.
FIG. 3f is a circuit showing an alarm section of the control system.

Referring to FIG. 3d, the fuel caution section 15 detects the fuel quantity in a fuel tank (not shown) to generate an alarm, and operates to forcibly stop the engine when a predetermined time lapses. A fuel level sensor 43 is provided in the fuel tank. When the level of fuel in the tank falls below a predetermined value, the sensor 43 operates to close a read switch provided therein.

The sensor 43 is connected to a cathode of a diode D14, an anode of which is connected to the source Vc1 through resistors R49 and R50. A base of a PNP transistor TR11 is connected between resistors R49 and R50. An emitter of the transistor TR11 is connected to the source VC1.

A collector of the transistor TR11 is connected to the ground through a resistor R51 and to a non-inverting input terminal of a comparator OP5 through resistors R53 and R52. A diode D15 and a resistor R54 connected in series are connected to the resistor R53 in parallel. A capacitor C8 is connected between resistors R53 and R52.

An inverting input terminal of the comparator OP5 is connected to the source Vc1 through resistors R55 and R56. An output terminal of the comparator OP5 is connected to a cathode of a diode D16, an anode of which is connected to an inverting input terminal of a pulse generator OP6 through a resistor R57.

A non-inverting input terminal of the pulse generator OP6 is connected between resistors R58 and R59 connected to the source Vc1 in series, for providing the reference voltage. An output terminal of the pulse generator OP6 is connected to the inverting and non-inverting input terminals thereof through resistors R60 and R61 in feedback connection, and further connected to a base of a PNP transistor TR12 through a resistor R62. A capacitor C9 is connected between the inverting input terminal and the resistor R60. The source Vc1 connected between the output terminal of the pulse generator OP6 and the resistor R62 through a resistor R63 is connected to the base of the transistor TR12 through a resistor R64 and to an emitter thereof. The collector of the transistor TR12 is connected to the ground through fuel lamps 44 and a resistor R65 and to an anode of a diode D17 through a resistor 66. A cathode of the diode D17 is connected to the alarm section 17. The fuel lamps 44 are provided on the panel 34.

When the comparator OP5 produces a high level signal, the voltage Vc1 is charged to the capacitor C9 through resistors R63 and R60. In accordance with the difference between the charged voltage in the capacitor C9 and the reference voltage in the pulse generator OP6, the pulse generator OP6 produces a H/L signal alternately. Thus, the transistor TR12 repeats on/off operations, so that fuel lamps 44 are intermittently turned on.

Between the collector of the transistor TR7 in the oil caution section 13 and a resistor R67, a non-inverting input terminal of a comparator OP7 is connected through a resistor R68. An inverting input terminal of the comparator OP7 is connected between resistors R68 and R69 which are connected in series to the source Vc1. An output terminal of the comparator OP7 is connected to an anode of a diode D18 through a capacitor C10 and a cathode of the diode D18 is connected to the ground through resistors R70 and R71. The source VC1 is connected between the output terminal of the comparator OP7 and the capacitor C10 through a resistor R72. Between the capacitor C10 and the ground, a resistor R73 and a cathode of a diode D19 are connected in parallel.

Between resistors R70 and R71, a base of an NPN transistor TR14 is connected. An emitter thereof is connected to the ground and a collector is connected to a non-inverting input terminal of a comparator OP8 through a resistor R74. Between the resistor R74 and the non-inverting input terminal of the comparator OP8, the source Vc1 is connected through a resistor R75 and a capacitor C11 is connected between the non-inverting input terminal and the ground.

An inverting input terminal of the comparator OP8 is connected between resistors R76 and R77 connected to the source Vc1 in series for applying the reference voltage.

An output terminal of the comparator OP8 is connected to a cathode of a diode D20, an anode of which is connected between a base of a PNP transistor TR26 and a resistor R79 through a resistor R78. The source Vc1 is connected between the output terminal of the comparator OP8 and the diode D20 through a resistor R80.

A timer T1 is provided for counting the lapsed time when fuel lamps 44 are intermittently turned on and for operating to stop the engine after a predetermined time. A source terminal Vs of the timer T1 is connected to the source Vc1. A reset terminal RE is connected to a collector of a PNP transistor TR15 through a resistor R81. A base of the transistor TR15 is connected to an anode of a diode D21 through a resistor R82. A cathode of the diode D21 is connected between the output terminal of the comparator OP5 and the diode D16. A resistor R83 is connected between the resistor R81 and the collector of the transistor TR15.

A constant voltage terminal Vcc is connected to the ground through a capacitor C12 to produce a stabilized constant voltage of the control voltage applied to the terminal Vs. Between the terminal Vcc and the capacitor C12, a resistor R84 connected to the base of the transistor TR15 is connected.

A start terminal ST is connected between the resistor R84 and the capacitor C12 through a resistor R85. A clock pulse input terminal $V_{CM}$ is connected between the resistor R85 and the capacitor C12 through a resistor R86. The terminal $V_{CM}$ is connected to a ground terminal GND through a capacitor C13, to which a collector of the transistor TR26 is connected through a resistor R87. An emitter thereof is connected between the resistor R85 and the capacitor C12.

A resistance of the resistor R87 is set lower than that of the resistor R86 so as to prevent the current applied to the $V_{CM}$ from flowing to the resistor R86.

An output terminal $V_{OUT}$ is connected to an anode of a diode D22 through a resistor R88 and a cathode of the diode D22 is connected to the engine stop section 16.

Engine Stop Section

Figure 3E:
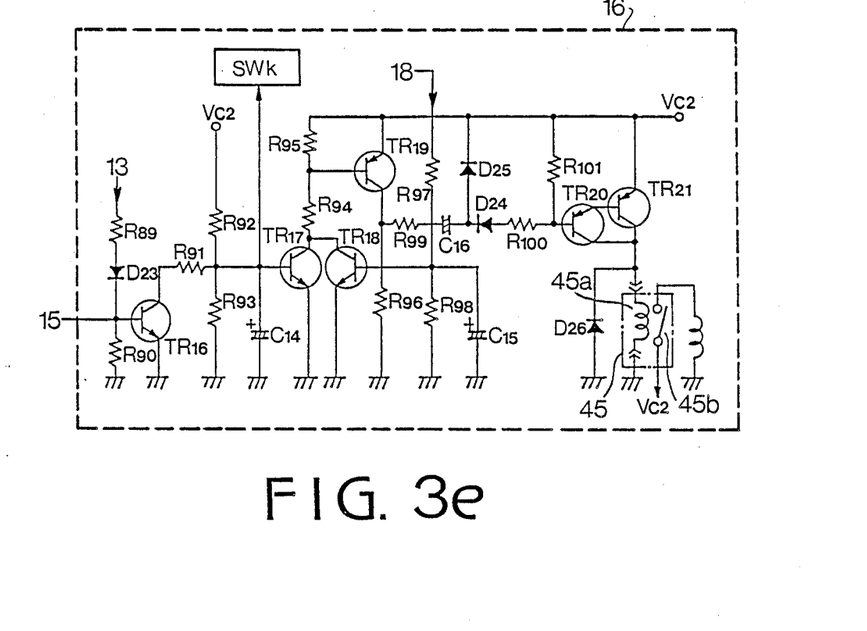
FIG. 3e is a circuit showing an engine stop section of the control system.

Referring to FIG. 3e, the engine stop section 16 operates to stop the engine by stopping the fuel pump or closing the intake passage in accordance with an output signal from the oil caution section 12 or the fuel caution section 15. An anode of a diode D23 is connected to the oil caution section 13 through a resistor R89 and a cathode of diode D23 is connected to the ground through a resistor R90. Between the diode D23 and the resistor R90, a base of an NPN transistor TR16 is connected, to which the diode D22 of the fuel caution section 15 is connected.

An emitter of the transistor TR16 is connected to the ground and a collector thereof is connected to a base of an NPN transistor TR17 through a resistor R91. Between the resistor R91 and the base of the transistor TR17, the battery source Vc2 is connected through a resistor R92 which is connected to the ground through a resistor R93.

Further a key switch SWk is connected to the base of transistor TR17 and to the ground through a capacitor C14. An emitter of the transistor TR17 is connected to the ground and a collector is connected to the source Vc2 through resistors R94 and R95.

Between the collector of the transistor TR17 and the resistor R94, a collector of an NPN transistor TR18 is connected, and an emitter is connected to the ground. A base transistor TR18 is connected to the ground through a capacitor C15. Between the source section 18 and ground, resistors R97 and R98 are connected in series.

Between resistors R94 and R95, a base of a PNP transistor TR19 is connected. An emitter of the transistor TR19 is connected to the source Vc2 and a collector is connected to the ground through a resistor R96. Between the collector of the transistor TR19 and the resistor R96, a cathode of a diode D24 is connected through a resistor R99 and a capacitor C16.

An anode of the diode D24 is connected to a base of a PNP transistor TR20 through a resistor R100. The transistor TR20 and a PNP transistor TR21 composes a Darlington circuit connection so that an emitter of the transistor TR20 is connected to a base of the transistor TR21 and a collector is connected to a collector of the transistor TR21. An emitter of transistor TR21 is connected to the source Vc2.

Between the capacitor C16 and the diode D24, an anode of a diode D25 is connected. A cathode is connected to the source Vc2 which is further connected between the transistor TR20 and resistor R100 through a resistor R101.

The collector of transistor TR21 is connected to an exciting coil 45a provided in a relay 45. A movable contact of a switch 45b is connected the source Vc2 and a fixed contact is connected to a coil of an actuator 46. Between the exciting coil 45a and transistor TR21, a cathode of a diode D26, an anode of which is connected to the ground is connected.

Figure 5:
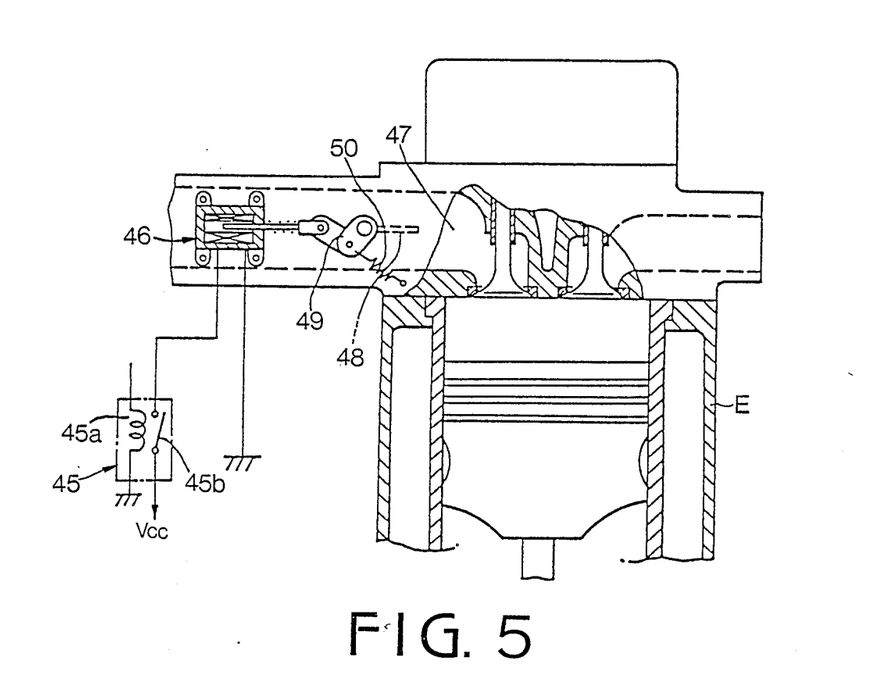
FIGS. 5 and 6 are sectional views of an engine stop device in operation states.
Figure 6:
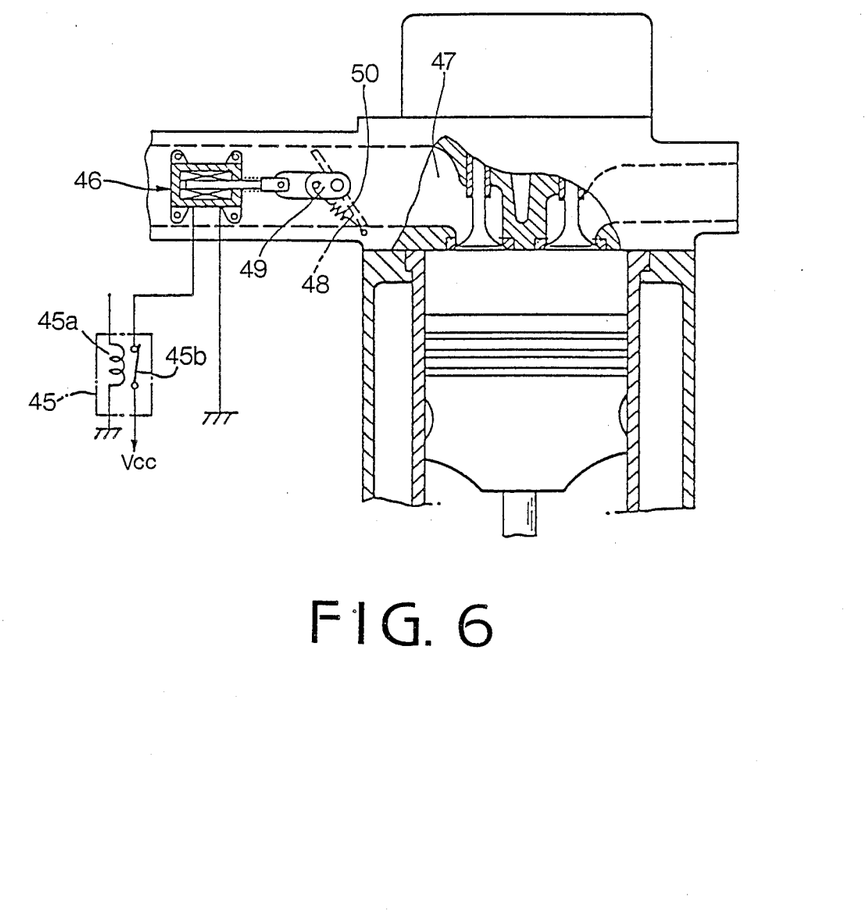

Referring to FIGS. 5 and 6 showing an example of an engine stop device, the device comprises the actuator 46 provided in an intake passage 47 of the engine E, a lever 49 connected to the actuator, a valve 48 secured to the lever, and an extension spring 50 provided between the lever 49 and an inner wall of the intake passage 47. The actuator 46 actuates in response to the operation of the relay 45 to close the valve 48 against the spring force of the spring 50.

Figure 7:
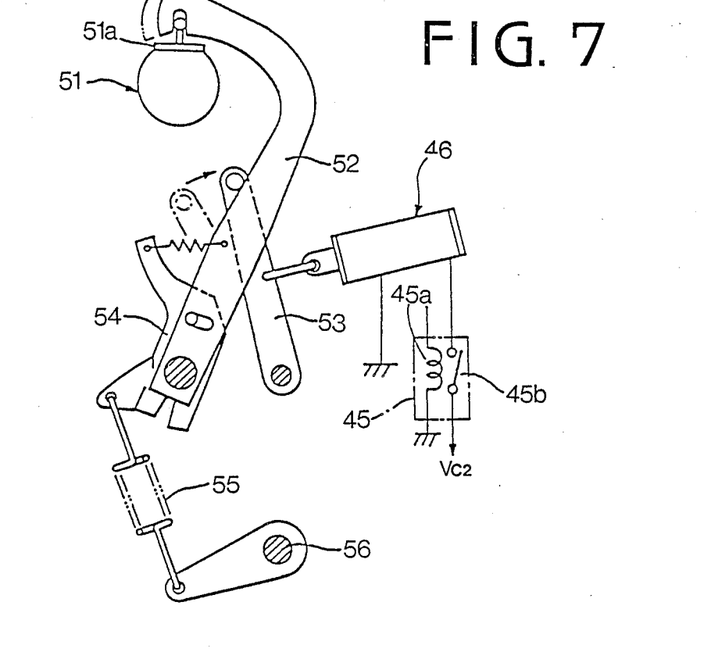
FIG. 7 is a schematic sectional view of a modification of the engine stop device.

Referring to FIG. 7 showing a further modification of the engine stop device, the actuator 46 is provided adjacent a fuel injection pump 51. The fuel pump 51 has a control rod 51a operated by a governor lever 51 for controlling the fuel quantity. The actuator 46 is connected to a stopper lever 53 for the governor lever 51. The actuator 46 actuates the stopper lever 53 to move in the clockwise direction as shown by an arrow of FIG. 7, so that the governor lever 52 is urged to move in the clockwise direction for operating the control rod 51a to restrict the fuel quantity from the pump 51. The governor lever 52 is connected to a governor shaft 56 through a control lever 54 and a governor spring 55.

Alarm Section

Referring to FIG. 3f, the alarm section 17 indicates an alarm in accordance with an output signal from the section 12, 13 or 15. The section 17 has a transistor TR24 a base of which is connected to the diode D17 of the section 15, diode D3 of the section 12 and diode D13 of the section 13. The diode D13 is connected to the ground through a resistor R102.

A collector of the transistor TR24 is connected to the ground and an emitter is connected to the source Vc2SD through a buzzer BZ1 as an alarm. A diode D27, an anode of which is connected to the transistor TR24, is connected to the buzzer BZ1 in parallel.

Source Section

Figure 3G:
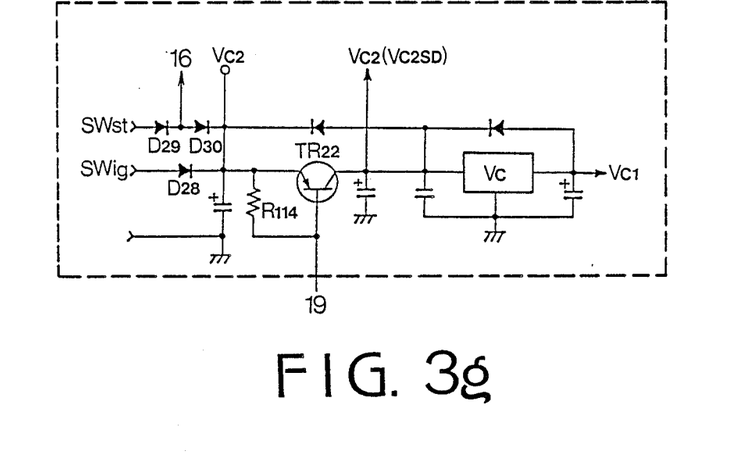
FIG. 3g a circuit showing a source section of the control system.

Referring to FIG. 3g, the source section 18 for supplying the voltage Vs2SD from the source Vc2 to each of the sections has a constant voltage circuit Vc. The source Vc2 is connected to an emitter of a transistor TR22, a collector of which is connected to the constant voltage circuit Vc. The circuit Vc produces a constant voltage which is supplied to each section. The voltage Vc2SD is supplied between transistor TR22 and circuit Vc. The base of transistor TR22 is connected to the battery caution section 19.

A key switch SWig connected to an ignition system is connected to the emitter of TR22 through a diode D28. A starting switch SWst connected to a start motor is connected to the emitter of transistor TR22 through diodes D29 and D30. Between diodes D29 and D30, the engine stop section 16 is connected.

Battery Caution Section

Figure 3H:
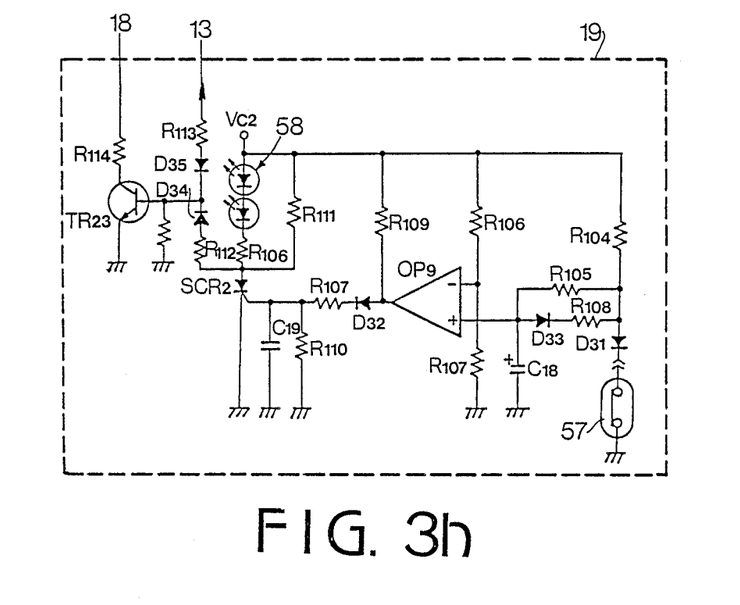
FIG. 3h is a circuit showing a battery caution section of the control system.

Referring to FIG. 3h, the battery caution section 19 detects a surface level of the electrolyte and the specific gravity thereof, and if detected values are lower than respective predetermined values, the section 19 operates to stop supplying the power from the source section 18 to each section.

A battery sensor 57 provided in the battery (not shown) is a float sensor for detecting the surface level of the electrolyte and the specific gravity thereof. When the surface level and the specific gravity are less than the predetermined values, the sensor 57 is turned off. The sensor 57 is connected to the source Vc2 through a diode D31 and a resistor R104. The ground is connected between the diode D31 and the resistor R104 through a resistor R105 and a capacitor C18.

The source Vc2 is connected to the ground through battery caution lamps 58, a resistor R106, and a thyristor SCR2, a gate of which is connected to an output terminal of a comparator OP9 through a resistor R107 and a diode D32.

An inverting input terminal of the comparator OP9 is connected between resistors R106 and R107 connected to the source Vc2 in series. An non-inverting input terminal of comparator OP9 is connected to an anode of a diode D33, a cathode of which is connected to an anode of the diode D31 through a resistor R108. The non-inverting input terminal of comparator OP9 is connected between resistor R105 and capacitor C18.

The source Vc2 is connected to the output terminal of comparator OP9. Between resistor R107 and thyristor SCR2, a resistor R110 and a capacitor C19 are connected. Between resistor 106 and thyristor SCR2, the source Vc2 is connected through a resistor R111 and an anode of a diode D34 is connected through a resistor R112. A cathode of diode D34 is connected to a cathode of a diode D35, an anode of which is connected to the transistor TR17 of the oil caution section Between diodes D34 and D35, a base of an NPN transistor TR23 is connected. An emitter of transistor TR23 is connected to the ground and a collector is connected to the transistor TR22 of the power source section 19 through resistor R114.

Operation

Operations of these sections will be described hereinafter.

In the overload caution section 12, during the operation of the engine, alternating voltage proportional to alternating current to the load is transferred through the current transformer 3. The alternating voltage is rectified by the rectifier 20 and smoothed by smoothing circuit 21, and applied to the terminal $V_{IN}$ of the level meter 23.

In normal operation, the voltage through the current transformer 5 is lower than the reference voltage of the comparator OP1, so that the comparator OP1 produces a low level (L) signal and the transistor TR1 is non-conductive and the transistor TR2 is conductive. Thus, the pulse generator OP3 produces a high level (H) signal.

The transistor TR3 is non-conductive and the overload lamps 37 are turned off. On the other hand, the transistor TR4 is turned on and the transistor TR5 is turned on. The voltage at the source Vc1 is applied to the reference terminal Vref of the level meter 23 through transistor TR5, resistors R3 and R5, as the reference voltage. In the level meter 23, the reference voltage at the terminal Vref is compared with the voltage at the terminal $V_{IN}$ and in accordance with the comparison, some of LEDs 24 to 33 are lighted, thereby indicating the magnitude of the output of the generator and the spare output in the actual driving conditions.

The voltage at the terminal $V_{IN}$ is applied to the non-inverting input terminal of the comparator OP2. A reference voltage V00 applied to the inverting input terminal of the comparator is represented as $$V00 = \{(Ra+Rcc+R5)/(Ra+Rcc+R5+R4+R3)\} \times Vc1$$

where Rcc is an internal resistance on the level meter 23.

The reference voltage V00 is set higher than the reference voltage at the terminal Vref by the resistance of resistor R5. In overload state, the voltage at terminal VIN according to the current transformer 3 becomes higher than the reference voltage at terminal Vref, so that all of LEDs 24 to 33 are lighted and the comparator OP2 produces a high level (H) signal.

As a result, the transistor TR1 is turned on and the transistor TR2 is turned off. Thus, the H signal from the pulse generator OP3 is fed-back through resistor R17 and charged in the capacitor C4. When the charged voltage in the capacitor C4 becomes higher than the reference voltage at the non-inverting input terminal of the pulse generator OP3, the pulse generator OP3 produces a low level (L) signal.

The output of the pulse generator OP3 is applied to the bases of transistors TR3 and TR4. The transistor TR3 is turned on and off to turn on and off the lamps 37.

The transistor TR4 is also turned on and off to turn and off the transistor TR5. When the transistor TR5 is turned off, the reference voltage V00 is applied through resistor R2 to terminal Vref. The voltage V00 reduces through the resistor R2, so that the excitations of LEDs 24 to 33 are kept. When the lamps 37 are turned on, the buzzer Bzl generates an alarm sound at the same time.

The comparator OP2 detects only the current in the circuit of the main coil 2 (armature circuit) and produces the H 5 or L signal. Consequently, if the power factor $\cos\theta$ becomes large, the comparator OP2 produces the L signal inspite of overload. However, the current transformer 5 in the exciter 10 detects actual load on the generator. The alternating voltage transferred by the current transformer 5 is applied to the non-inverting input terminal of the comparator OP1 through the rectifier 35 and the smoothing circuit 36. The comparator produces the H signal, when the generator is over-loaded.

Thus, the transistor TR1 is caused to be turned on, so that the lamps 37 are lighted and buzzer BZ1 is operated in accordance with the aforementioned operations. When transistor TR5 is turned off, a low reference voltage is applied to the terminal Vref through resistors R2 to R5. The reference level is reduced to excite all of LEDs 24 to 33. When the transistor TR5 is turned on, the reference voltage becomes the normal set value, so that only some of LEDs corresponding to the voltage from the current transformer 3 emit lights.

At overload driving, even if all LEDs are not excited because of low actual output voltage reduced by the power factor, residual LEDs are excited for indicating the fact there is no spare output power.

Figure 3I:
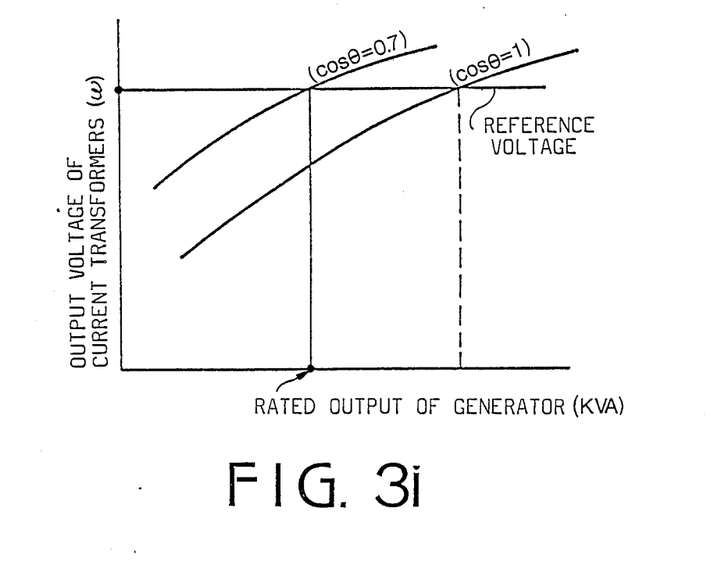
FIG. 3i is a graph showing a relationship between the output voltage of a current transformer and the output of the generator.

FIG. 3i shows the relationship between the output voltage of the current transformer 5 and the output of the generator. The reference voltage applied to the inverting input terminal of the comparator OP1 is determined based on the power factor. If the reference voltage is set to a value corresponding to the power factor $\cos\theta = 0.7$, overload in such a state where the actual power factor larger than 0.7 can not be detected, because the voltage at the non-inverting input of the comparator OP1 is lower than the reference value.

Accordingly, the current transformer 5 operates to detect overload when the power factor is lower than the value corresponding to the reference voltage at the comparator OP1, and the current transformer 3 detects overload when the power factor is larger than the reference value.

In the section 13, when the engine starts, the current from the tap for charging the battery is rectified by the rectifier 38 and smoothed by the capacitor C1 and applied to the photocoupler 39.

The transistor TR6 is turned on and the transistor TR7 is turned on, so that the source Vc1 is applied to the base of transistor TR8 to turn on it. The battery voltage Vc2 is applied to the operating lamps 40 to turn on them.

The oil pressure switch SW1 is turned on at the stopping of the engine or at the decreasing of the oil pressure and is turned off when lubricating oil pressure increases at the starting of the engine.

When the engine stops, the transistor TR7 is turned off and the voltage Vc1 is not applied to the transistor TR9. Consequently, the voltage at the non-inverting input of the comparator OP4 is lower than the reference voltage at the inverting input terminal of comparator. Thus, the comparator OP4 produces the L signal to cut the thyristor SCR1. The transistor TR10 is turned off to turn off the oil lamps 41.

When the oil decreases, the oil pressure gradually reduces to turn off the switch SW1. The current is fed to the base of the transistor TR9 to turn it on and the voltage is applied to the non-inverting input terminal of the comparator OP4 through the time constant circuit including resistor R36 and capacitor C6.

When the voltage applied to the non-input inverting terminal of comparator OP4 exceeds the reference voltage applied to the inverting input terminal, the comparator OP4 produces the H signal which is applied to the thyristor SCR1 to render it conductive. The transistor TR10 is turned on to turn on the oil lamps 41. At the same time, an engine stop signal is applied to the section 16 and an alarm signal to the section 17 through the thyristor SCR1.

Since on and off operations of the switch SW1 are cancelled by the time constant circuit, erroneous operation can be prevented.

Since the oil pressure switch SW1 in the section 13 is turned on during the stopping of the engine, when the key switch is turned on, all of the LEDs 42a to 42j emit light. When the engine is started, even if the switch SW1 is turned off, the transistor TR8 is turned on to keep LEDs on.

Thus, a comparatively large current flows in the switch SW1. A minimum current between 50 and 100 $\mu$A for operating the switch SW1 is obtained.

In the section 15, if the fuel is stored in the tank more than a predetermined level, the fuel sensor 43 is turned off so that the transistor TR11 is turned off. The comparator OP5 produces the L signal to turn on the transistor TR15. When the transistor TR15 is turned on, the terminal PE of the timer T1 is applied with the reset signal from the voltage terminal Vcc to maintain the timer T1 in non-operation state.

The pulse generator OP6 produces the H signal to maintain the transistor TR12 in the off state, so that the fuel lamps 44 and the alarm section 17 are inoperative.

When the level of the fuel in the tank lowers, the sensor 43 closes to turn on the transistor TR11, so that the voltage is charged in the capacitor C8. Even if the sensor 43 repeats on and off operations, during the time for charging the capacitor C8, the operation is cancelled to prevent an erroneous operation of the comparator OP5.

When the voltage applied to the non-inverting input terminal of the comparator OP5 becomes higher than the reference voltage applied to the inverting input terminal, the output terminal thereof becomes off. Thus, the pulse generator OP6 produces a driving pulse to repeatedly turn on and off the transistor TR12 so that the fuel lamps 44 are intermittently turned on and the transistor TR24 in the alarm section 17 is turned on and off to generate the buzzer BZ1.

When the comparator OP5 produces the H signal, the transistor TR15 is turned off and the timer T1 counts the clock pulses applied to the terminal $V_{CM}$ in accordance with the starting signal applied to the starting terminal ST. The clock pulses are produced with charge/discharge voltages at the capacitor C13. When the timer T1 counts the predetermined number of clock pulses, that is, the predetermined time has elapsed, the output terminal VOUT produces the engine stop signal which is applied to the section 16.

When the engine is re-started, the transistor TR7 in the section 13 is turned on. The voltage higher than the reference voltage is applied to the non-inverting input terminal of the comparator OP7 and a differential signal is supplied from the output terminal to the transistor TR14 to turn on the transistor TR14 for a time. The comparator OP8 produces the L signal.

The transistor TR26 is turned on to charge the voltage at the voltage terminal Vcc in the capacitor C13 through resistor R87. A duration of the clock pulses from the capacitor C13 is small by the resistance of the resistor R87, so that the elapsed time is shortened in response to the number of pulses Thus, the engine stop signal from the terminal VOUT is produced at a high speed after re-starting of the engine.

If the fuel is supplied during driving, the fuel sensor 43 is turned off. The transistor TR15 is turned on and the reset signal is applied to the terminal RE, so that the timer T1 becomes inoperative.

In normal driving, the key switch SWk in the section 16 is turned off and connected to the ground. When the key switch SWk is turned on, the source Vc2 is applied to transistor TR17 to turn it on, thereby turning on transistor TR19, and transistor TR20 is turned off.

When the key switch is turned off to stop the engine, the transistor TR17 is turned off. The source Vc2 is fed to transistor TR21, transistor TR20, resistor R100, diode D24, capacitor C16, and resistors R99 and R96, so that the Darlington circuit becomes operative.

Thus, the exciting coil 45a of the relay 45 is excited to close the switch 45b, so that the actuator 46 actuates the engine stop device as shown in FIGS. 5 to 7 to stop the engine.

The capacitor C16 is gradually charged to increase the voltage. When the charged voltage approximately equals the supply voltage, the transistor TR20 goes off and the relay 45 is opened. Thus, the current to the actuator 46 is cut off.

When the transistor TR16 is applied with the engine stop signal from the oil caution section 13 or the fuel caution section 15, the transistor becomes conductive to turn off the transistor TR17, so that the engine is forcibly stopped. As a result, burnout of the engine or induction of air in the fuel pump caused by lack of the fuel can be prevented.

When the starting switch SWst is closed, the voltage is applied to the transistor TR18 through resistor R97 to turn it on. Then the transistor TR19 is caused to be on so that the voltage charged in the capacitor C16 is discharged through diode D25 and transistor TR19. The voltage is discharged at the re-starting of the engine.

When the transistor TR24 of the alarm section 17 is applied with the alarm signal (H signal) from the overload caution section 12, oil caution section 13, or fuel caution section 17, the transistor TR24 is turned on to operate the buzzer BZ1.

When the level of the electrolyte and specific gravity thereof are more than the predetermined values, the battery sensor 57 is closed, so that the source Vc2 is connected to the ground through resistor R104. The constant voltage source Vc2 is applied to the transistor TR23 through resistors R111, R112 to turn on the transistor TR23. Thus, the transistor TR22 in the source section 18 is turned on to supply the control voltage and constant voltage to each of the sections When the level of the electrolyte becomes lower than the predetermined level, the sensor 57 is opened, so that the source Vc2 is charged in the capacitor C18 through resistors R104 and R105. The voltage discharged from capacitor C18 is fed to the non-inverting input terminal of comparator OP9. When the voltage exceeds the reference voltage applied to the inverting input terminal, the comparator OP9 produces the H signal which is applied to the thyristor SCR2 to open it.

The source Vc2 is fed to the battery caution lamps 58 to turn on them for indicating the lack of the electrolyte. At the same time, the transistor TR23 goes off and a source stop signal (H signal) is applied to the transistor TR22 through resistor R114 to turn it off. As a result, voltages Vc2 and Vc1 are cut off, and the operations of all sections stop Although the battery caution lamps 58 continue to emit the light, since the power consumption thereof is very little, a minimum capacity of the battery is ensured.

While the presently preferred embodiments of the present invention has been shown and described, it is to be understood that this disclosure is for the purpose of illustration and that various changes and modifications may be made without departing from the scope of the invention as set forth in the appended claims.

What is claimed is:

1. A system for detecting a load on an engine driven generator, wherein
    the generator comprises an armature circuit including a first coil connected to the load, and an exciter circuit including a second coil and operating to prevent reduction of an output voltage of the first coil;
    the system comprises first detector means for detecting an amount of current produced in said armature circuit;
    indicating means stepwise operative for indicating variation of the load, the indicating means including a plurality of lamps;
    setting means for setting a reference signal with a first reference value serving as a basis for determining an overload condition in dependency on the current in the armature circuit, said setting means including means for varying the value of said reference signal to a second reference value lower than the first reference value to energize all of the lamps to emit light;
    first comparing means for comparing an output of said first detector means with the reference signal, said indicating means indicating an overload condition with the lamps in response to an output of said first comparing means upon an output signal of said first detector means exceeding the reference signal;
    second detector means for detecting an amount of current produced in said exciter circuit;
    second comparing means for comparing an output of the second detector means with a third reference value, said second comparing means producing an actual overload signal representing an actual overload condition of the generator upon an exceeding of the third reference value by the output of said second detector; and
    wherein said varying means of said setting means is responsive to the overload signal of said second comparing means for alternately producing the first reference value and the second reference value; and
    the indicating means is responsive to the reference signal of said setting means for flashing some of the lamps in accordance with an alternate comparing of the output of the first detector means with the first reference value and the second reference value so as to provide warning of the actual overload condition of the generator.

2. The system according to claim 1 wherein
said first and said second comparators are operative to produce respective overload signals from measurements of currents in the armature and the exciter circuits of the generator in accordance with a power factor dependent on the load.

3. The system according to claim 1 wherein each of said first and said second detector means includes a current transformer.

4. The system for detecting a load on an engine driven generator according to claim 1, wherein
said varying means of said setting means comprises a resistive divider circuit;
a pulse generator coupled to said resistive divider circuit; and
means responsive to the overload signal of said second comparing means for gating said pulse generator into a state of operation.

5. The system for detecting a load on an engine driven generator according to claim 4, wherein said resistive divider circuit provides said reference signal.

6. The system for detecting a load on an engine driven generator according to claim 5, wherein
said first and said second reference values are provided, respectively by first and second values of output signal of said pulse generator.

* * * * *